United States Patent [19]

Skrentner

[11] 4,154,555
[45] May 15, 1979

[54] MULTIPLE BORING HEAD

[75] Inventor: Frank C. Skrentner, Bloomfield Hills, Mich.

[73] Assignee: F. Jos. Lamb Company, Warren, Mich.

[21] Appl. No.: 892,660

[22] Filed: Apr. 3, 1978

[51] Int. Cl.² .............................................. B23B 47/00
[52] U.S. Cl. ........................................ 408/25; 408/26; 408/150; 408/158; 29/27 C
[58] Field of Search .................... 408/8, 10, 13, 24, 25, 408/26, 22, 150, 151, 158; 82/2 E, 1.2, 1.4; 29/27 C, 27 R

[56] References Cited

U.S. PATENT DOCUMENTS

| | | | |
|---|---|---|---|
| 3,884,590 | 5/1975 | Skrenter et al. | 408/8 |
| 3,902,386 | 9/1975 | Dressler et al. | 408/158 X |
| 4,004,332 | 1/1977 | Wawrzyniak | 408/26 X |

Primary Examiner—Gil Weidenfeld
Attorney, Agent, or Firm—Barnes, Kisselle, Raisch & Choate

[57] ABSTRACT

A machine tool having a boring bar carrying cutting tools and mounted for rotative adjustment on a rotary driven spindle with its axis offset from the axis of the spindle. An additional cutting tool is mounted for radial adjustment on the spindle individually of the boring bar. The tools on the boring bar and the cutting tool on the spindle are adjusted radially by means of a helically splined nut engaged with a similarly splined shaft which is rotated relative to the spindle in response to axial displacement of the shaft.

15 Claims, 12 Drawing Figures

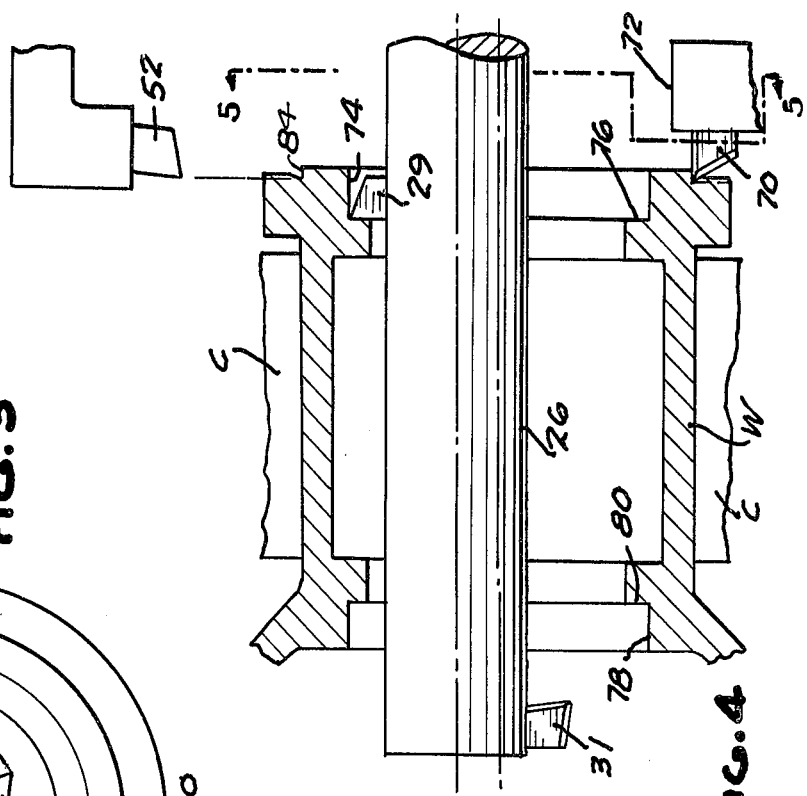
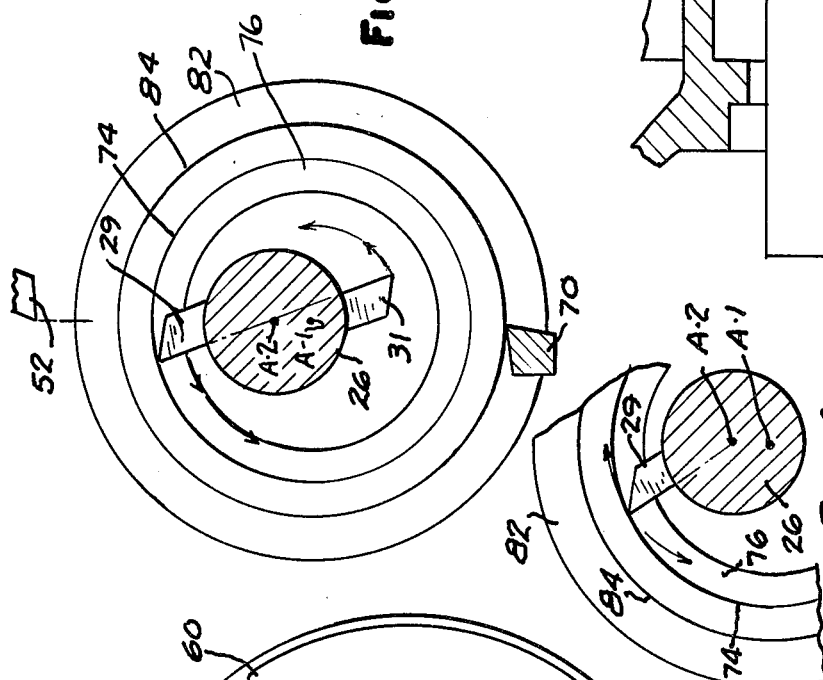
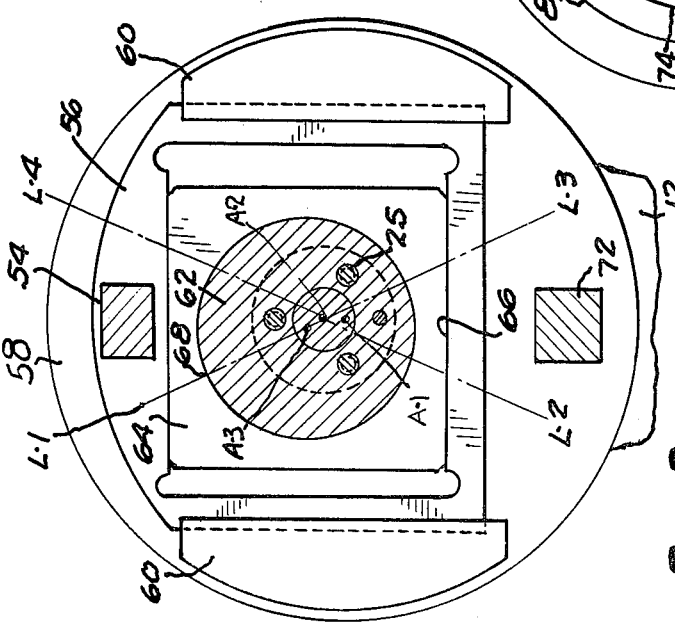
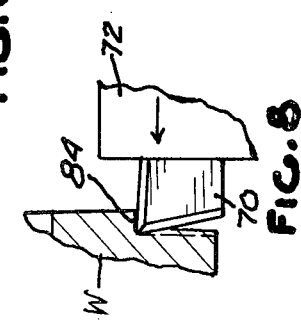
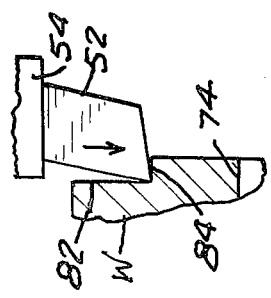

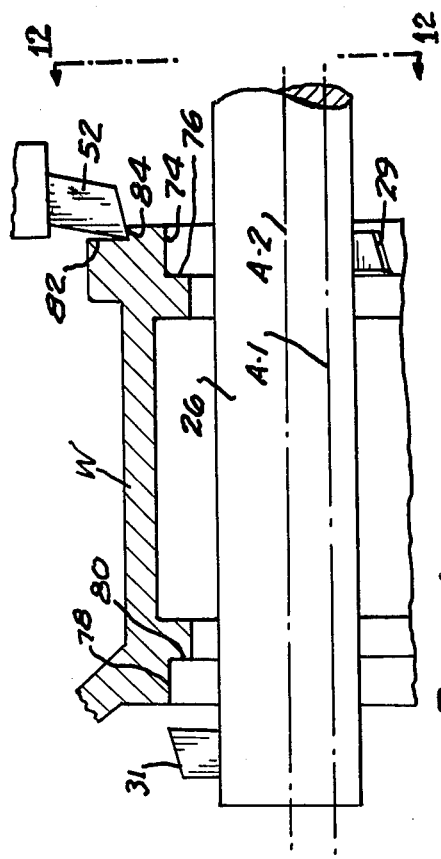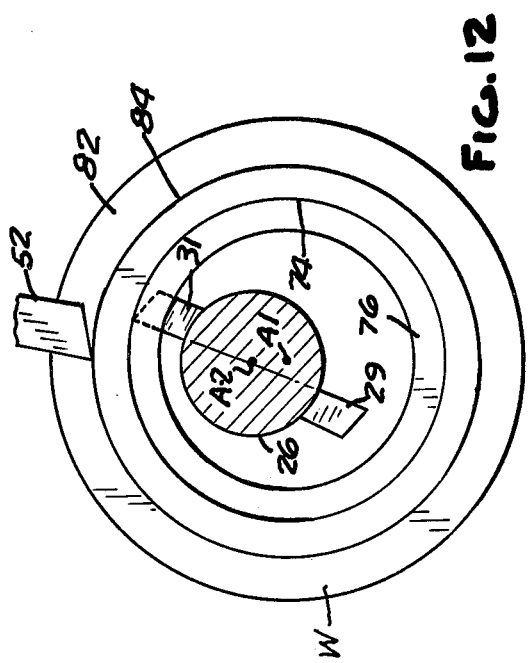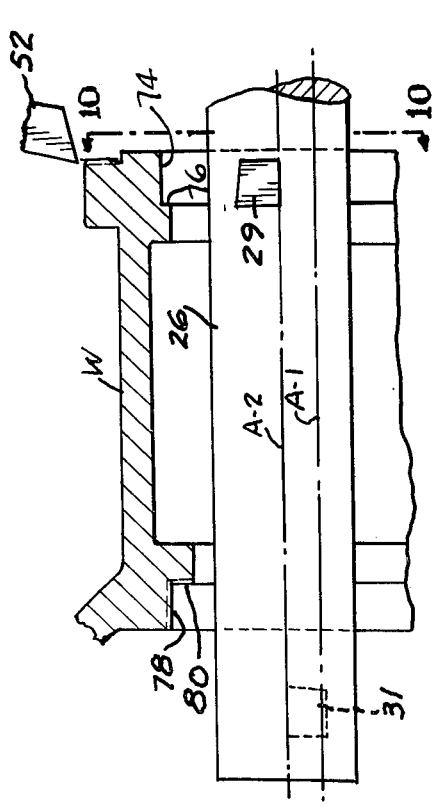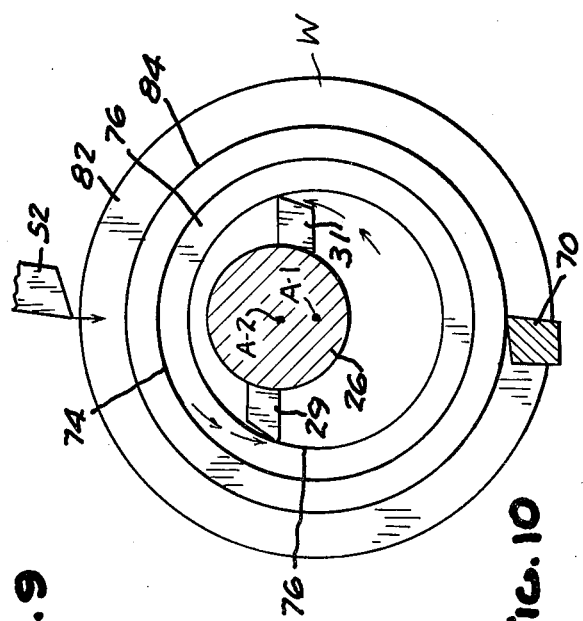

MULTIPLE BORING HEAD

This invention relates to a machine tool boring spindle, and, more particularly, to an adjusting means on a boring tool spindle for automatically displacing a plurality of tools radially for successively machining a plurality of annular surfaces on a workpiece during a single work cycle of the spindle.

Many workpieces have to be machined with a plurality of co-axial bores or cylindrical surfaces, each terminating in a shoulder at one end. This is true, for example, of castings designed to receive bearings and seals for supporting or enclosing one or more coaxial shaft members. The bearings and seals are seated on cylindrical surfaces and bear against machined shoulders at the ends of such surfaces. In many such castings it is extremely important that the bores or cylindrical surfaces are coaxial to a high degree of accuracy and that the shoulders are perpendicular to the axis of the bores to a high degreee of accuracy. As is disclosed in U.S. Pat. No. 3,884,590, this can be readily accomplished by mounting a pair of cutting tools on a single boring bar so that two bores can be successively machined in a single continuous operation of the machine. However, in the arrangement shown in said patent the number of bores that can be machined in one cycle of the machine is limited to two. Additional bores or cylindrical surfaces require machining as a separate operation. The present invention is an improvement over the arrangement shown in said patent.

The primary object of the present invention is to enable machining of at least three coaxial bores or cylindrical surfaces with square shoulders to a high degree of accuracy in a single continuous operation.

A further and more specific object of this invention is to provide a boring machine wherein two tool holders, one of which has at least two cutting tools thereon, are mounted on a single boring machine spindle and a single mechanism is provided for radially displacing both tool holders simultaneously so that at least three bores or cylindrical surfaces can be machined on a workpiece in a single continuous cycle of the machine.

Other objects, features and advantages of the present invention will become apparent from the following description and accompanying drawings, in which:

FIG. 3 is a sectional view along the line 3—3 in FIG. 1;

FIG. 4 is an enlarged fragmentary view of a portion of the arrangement shown in FIG. 1;

FIG. 5 is a sectional view along the line 5—5 in FIG. 4;

FIG. 6 is a fragmentary sectional view illustrating the manner in which the boring bar is rotated about its axis to adjust the positions of the cutting tools thereon in a radial direction;

FIGS. 7 and 8 are fragmentary sectional views showing the manner in which two of the cutting tools operate; and FIGS. 9, 10, 11 and 12 show the progression of the cutting tools during a cutting cycle, FIGS. 10 and 12 being taken along the lines 10—10 and 12—12 of FIGS. 9 and 11 respectively.

Figure 1:
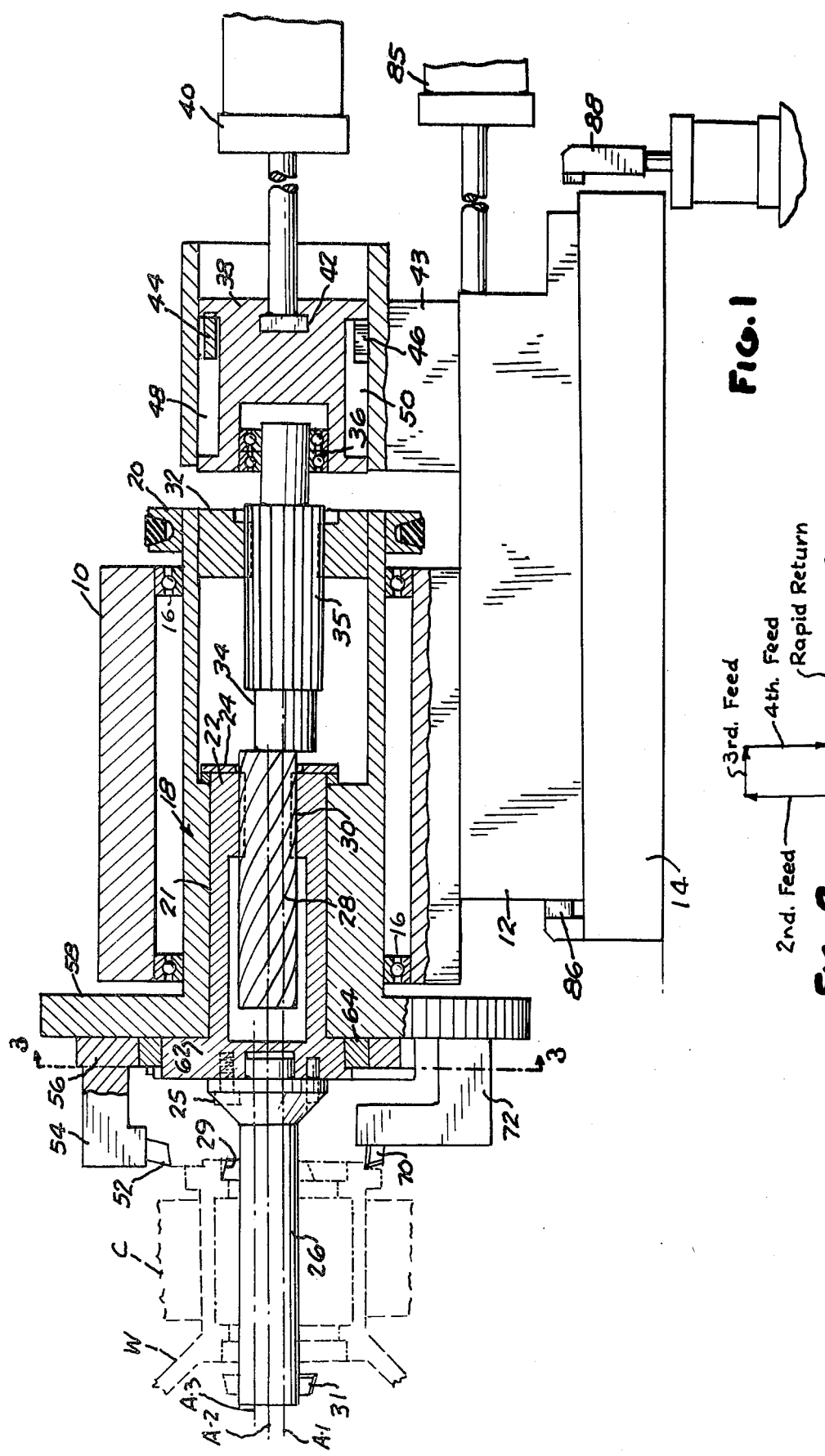
FIG. 1 is a somewhat diagrammatic, partial longitudinal cross section of a machine tool having a boring spindle embodying the present invention.

In FIG. 1 there is illustrated one form of machine tool embodying the present invention. The machine includes a spindle housing 10 mounted on a slide 12 which is in turn mounted for rectilinear sliding movement on a base 14. Journalled within housing 10, as by bearings 16, is a hollow spindle 18 rotationally driven by a belt and pulley 20 from a motor (not illustrated). Spindle 18 rotates about an axis A-1. Mounted within the bore 21 of a spindle 18 there is journalled a flange nut 22 which is prevented from shifting axially relative to spindle 18 by a retainer and bearing member 24. Thus, flange nut 22 is permitted to rotate within, but prevented from moving axially of, spindle 18. On the other end of nut 22 there is securely mounted, as by screws 25, a boring bar 26 which carries two single point cutting tools 29 and 31. Tools 29, 31 are mounted on boring bar 26 in generally diametrically opposed relation. Boring bar 26 is mounted on nut 22 concentric with the bore 21, the axis of rotation of nut 22 and boring bar 26 being designated A-2. It will be observed that axis A-2 is radially offset from the axis A-1 of the spindle 18 a selected distance as shown more clearly in FIG. 3. The axially inner end of nut 22 is formed with helical splines 30 that are engaged with mating helical splines 28 formed on the radially off-set portion of a shaft 34. The axis of the helically splined portion 28 coincides with axis A-2 and the straight splined portion 35 of shaft 34 has its axis coinciding with axis A-1.

Spline portion 35 engages a similarly straight splined insert 32 which is fixedly mounted at the inner end of spindle 18 concentric with the axis A-1. Insert 32 prevents relative torsional shift between spindle 18 and shaft 34 while permitting relative axial movement therebetween. The helix angle of the spline set 28,30 is approximately 30°. Any axial movement of shaft 34 will cause an angular displacement of nut 22, and, consequently, of tools 29,31. Shaft 34 is rotationally coupled to a cylindrical slide 38 by thrust bearings 36 which are so secured as to withstand the thrust forces imposed by a fluid cylinder 40 through the T slot coupling 42. Slide 38 is mounted for reciprocation in a block 43 fixed on slide 12. When spline shaft 34 is displaced axially by cylinder 40 through slide 38 it is prevented from rotating relative to spindle 18 by the engagement of straight spline portion 35 with splined insert 32. However, axial displacement of shaft 34 causes rotation of nut 22 about the axis A-2 by reason of the interengagement of the helical splines 28,30. If the diametrically opposed cutting tools 29,31 on boring bar 26 are so arranged that their cutting edges lie on a line which passes through both axes A-1 and A-2, when shaft 34 is at one end of its stroke the same condition will exist after the shaft travels to the opposite end of its stroke and nut 22 rotates through 180°. The stroke of shaft 34 is determined by a pair of wedges 44,46 arranged within slots 48,50, respectively, in cylindrical slide 38. Wedges 44,46 are adjustable in a direction perpendicular to the longitudinal axis of slide 38. Adjustment of these wedges, therefore, controls the position of slide 38 at each end of its stroke. The position of slide 38 at each end of its stroke in turn determines the radial position of the cutting tools 29,31 relative to the axis A-1, that is, the axis about which they are rotating with spindle 18. The arrangement thus far described, and particularly the function and operation of wedges 44,46, is fully disclosed in the aforesaid U.S. Pat. No. 3,884,590.

The present invention is directed primarily to the provision of additional cutting tools on the spindle which are automatically sequenced in the course of a single cycle of the machine. One of these additional tools is designated 52 and is mounted on a block 54 carried by a slide 56. Slide 56 is mounted on the flanged end 58 of spindle 18 and is retained and guided for rectilinear movement thereon by gibs 60. The flanged end of nut 22 is formed as a cylindrical eccentric 62, the central axis of which is designated A-3. Eccentric 62 is in the form of a circular hub seated within the cylindrical opening of a follower block 64 that is guided for rectilinear movement in slot 66 formed in slide 56. As shown in FIG. 3, the radial distance between axes A-1 and A-3 is approximately at least twice the radial distance between the axes A-1 and A-2. The high point 68 of eccentric 62 and tool 29 preferably lie in the same radial plane which passes through axes A-2 and A-3 as shown in FIG. 3. With the above described arrangement it will be appreciated that when nut 22 is rotated relative to spindle 18 tool 52, as is the case of tools 29,31, is shifted radially relative to the axis A-1 of the spindle.

A fourth single edge cutting tool 70 is fixedly mounted on a tool block 72. Tool block 72 is in turn fixedly attached to flange 58 of spindle 18 in a position preferably diametrically opposite tool block 54. The tips of tools 52,70 lie in the same radial plane.

The workpiece to be machined by the tools described comprises a casting W adapted to be fixedly located relative to base 14 by means of a pallet, chuck or other work-holding device designated C. Referring to FIG. 4, in the tool arrangement described tool 29 is arranged to machine bore 74 and shoulder 76; tool 31 is arranged to machine bore 78 and shoulder 80; tool 52 is arranged to machine face 82; and tool 70 is arranged to machine the cylindrical surface 84.

Figure 2:
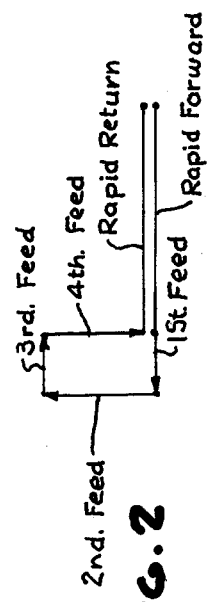
FIG. 2 is a diagram of the machine cycle.

One complete machining cycle of the machine is illustrated diagrammatically in FIG. 2. In the starting position slide 12 is in a fully retracted position and slide 38 is in the full forward position wherein the rear face of slot 48 abuts wedge 44. Thus, nut 22 has been rotated relative to spindle 18 to shift tool 29 to its radially outermost position. Tool 29 lies on the radial line designated L-1 in FIG. 3. This position is determined by the interengagement of wedge 44 with the rear end face of slot 48. The cutting cyle is initiated by advancing slide 12 forwardly first at a rapid rate and then at a feed rate as the cutting tool 29 approaches the workpiece. Slide 12 is powered by a cylinder 85. In the aforesaid position tool 29 is located radially relative to the axis A-1 to machine the bore 74 to the desired diameter. As the slide approaches the end of its forward stroke, tool 70 machines the cylindrical surface 84 to the proper diameter (FIG. 8) while tool 29 finishes bore 74. At this time tool 52 is located axially in its proper position to machine face 82 and tool 31 is positioned axially outward beyond the opposite end of the workpiece. The axial depth of bore 74 is determined by an adjustable stop 86 on base 14 which is engaged by slide 12 to limit the forward movement thereof. This is the position of the mechanism as shown in FIG. 1.

After slide 12 engages stop 86, cylinder 40 is actuated by a switch (not shown) to retract slide 38 to a position wherein wedge 46 abuts beyond the forward end of slot 50. This is designated as the second feed in FIG. 2. As the shaft 34 is retracted nut 22 is rotated somewhat less than 180° relative to the spindle 18. Referring to FIG. 3, nut 22 is rotated so that tool 29 is shifted circumferentially relative to the spindle from the position designated L-1 to the position designated L-2. At the same time, tool 31, which is preferably located on boring bar 26 diametrically opposite tool 29, is shifted circumferentially from the position designated L-3 to the position designated L-4. As the boring bar 26 is being rotated relative to spindle 18, the latter being driven by the pulley and belt 20, tool 29 is being shifted radially inwardly to machine shoulder 76. The initial position of tool 29 is shown in FIGS. 4 and 5 and the manner in which it is radially retracted relative to the axis A-1 is illustrated in FIGS. 6 and 10. The axes A-1, A-2 and A-3 are so located relative to one another such that tool 52 does not engage face 82 until tool 29 has been retracted radially inwardly to finish machining shoulder 76. This is illustrated in FIGS. 9 and 10 and insures that any disturbance of the workpiece by the action of tool 29 will not affect the cutting action of the other tool 52. The radially innermost position of tool 52 is shown in FIG. 7.

When slide 38 is in the fully retracted position, tool 52 has been advanced radially inwardly to the position shown in FIGS. 11 and 12 wherein the face 82 is fully machined and tool 31 has been shifted radially outwardly to machine bore 78 to the desired diameter when slide 12 is thereafter retracted during the portion of the cycle designated "third feed" in FIG. 2. The position of slide 12 at the end of the cycle portion designated "third feed" is determined by a retractable stop 88. When the slide engages stop 88 tool 31 has been advanced axially to the right from the position shown in FIG. 11 so as to be properly positioned to machine shoulder 80. At this point a suitable switch (not illustrated) again actuates cylinder 40 to retract slide 38 to its starting position relative to slide 12 so that tool 31 will be shifted radially inwardly to machine shoulder 80 and tool 29 will be shifted radially outwardly to its proper position for machining bore 74 on the next workpiece.

In the workpiece illustrated the diameters of bores 74 and 78 are critical and the precise location of wedges 44,46 to limit the stroke of slide 38 at its opposite ends must be very precise. Although the radially inwardmost position of tool 52 may vary slightly when tool 31 is size-compensated by the adjustment of wedge 46, face 82 and cylindrical surface 84 simply form a locating pilot portion on the workpiece, and, if the junction of these surfaces are slightly beveled or undercut, this does not present any objection since the bore on the end of the mating workpiece may be chamfered.

I claim:

1. In a machine tool the combination comprising a housing, a spindle journalled in said housing for rotation about a first axis, drive means for rotating said spindle, means for supporting a workpiece in axial alignment with said first axis, means for moving the spindle and workpiece support axially relative to one another, an annular member fixed axially on said spindle for rotation therewith, said annular member also being rotatable relative to said spindle about a second axis parallel to and spaced from said first axis, a first tool holder fixedly mounted on said annular member for rotation therewith, a cutting tool mounted on said first tool holder such that, when the annular member is rotated relative to said spindle, said cutting tool is shifted radially toward and away from said first axis, a second tool holder mounted on said spindle for rotation therewith and for radial movement thereon, a cutting tool mounted on the second tool holder and having a cutting point thereon, means connecting the second tool holder and the annular member such that the second tool holder and the cutting tool thereon are displaced radially on said spindle toward and away from said first axis in response to rotation of the annular member relative to the spindle, and means for incrementally rotating the annular member about said second axis relative to said spindle while the spindle is rotatably driven about said first axis to simultaneously displace both the first and second mentioned tools radially relative to said first axis.

2. The combination set forth in claim 1 wherein the means connecting the second tool holder and said annular member comprises a circular hub on said annular member having a central axis which is parallel to and spaced radially from said first and second axes, follower means on the second tool holder having a circular socket rotatably engaging the circular hub on said annular member for displacing the second tool holder radially on said spindle relative to said first axis in response to relative rotation between the annular member and said spindle.

3. The combination set forth in claim 2 wherein said second tool holder comprises a slide on said spindle guided for rectilinear radial movement thereon.

4. The combination set forth in claim 2 wherein said spindle has a radially extending guideway thereon, said second tool holder being mounted in said guideway for rectilinear movement.

5. The combination set forth in claim has a wherein the second tool holder has rectilinear guideway thereon perpendicular to the rectilinear guideway on the spindle, said follower means being guided for rectilinear movement in said second-mentioned guideway.

6. The combination set forth in claim 5 wherein said first tool holder has a second cutting tool mounted thereon which is spaced axially from and generally diametrically opposite the first mentioned cutting tool so that when said annular member is rotated relative to said spindle one of the cutting tools on the first tool holder is shifted radially toward said first axis while the other is shifted radially away from said first axis.

7. The combination set forth in claim 1 wherein said means connecting the second tool holder and said annular member comprises a first radial guideway on said spindle, said tool holder being mounted in said guideway for movement radially on said spindle, a second radial guideway on said tool holder extending perpendicular to said first guideway, a guide block slideably mounted in the second guideway and a cylindrical boss on said annular member having a central axis parallel to and spaced from said first and second axes, said guide block having a circular opening therein engaging said cylindrical boss.

8. The combination set forth in claim 1 including a third tool holder fixedly mounted on said spindle, a cutting tool fixedly mounted on said third tool holder and having a cutting tip lying in substantially the same radial plane as the cutting tip of the second mentioned cutting tool.

9. The combination set forth in claim 8 wherein said third cutting tool is positioned to machine a cylindrical surface on the workpiece when the workpiece and spindle are moved relatively axially and the cutting tool on the second tool holder is positioned to machine a radial shoulder on the workpiece intersecting and perpendicular to said cylindrical surface when the annular member is rotated relative to the rotating spindle.

10. The combination set forth in claim 1 wherein the first and second mentioned cutting tools are located relative to each other such that when the annular member is rotated in one direction relative to the rotating spindle the first and second mentioned cutting tools are both displaced radially inwardly to machine two discrete annular shoulder portions on the workpiece.

11. The combination set forth in claim 10 wherein said second and third axes are spaced radially from said first axis such that when the annular member is rotated in one direction relative to the rotating spindle one of the last-two-mentioned tools is displaced radially out of cutting engagement with the workpiece before the other is displaced radially into cutting engagement with the workpiece.

12. The combination set forth in claim 11 wherein the cutting tool on the second tool holder is spaced radially outwardly from the cutting tool on the first tool holder.

13. The combination set forth in claim 11 wherein said third axis is spaced radially from said first axis a greater distance than the spacing between said first axis and said second axis.

14. The combination set forth in claim 13 wherein the cutting tool on the first tool holder lies generally in a plane passing through said second and third axes.

15. The combination set forth in claim 14 wherein the second axis is located radially intermediate the first and third axes.

* * * * *

UNITED STATES PATENT AND TRADEMARK OFFICE
CERTIFICATE OF CORRECTION

PATENT NO. : 4,154,555
DATED : May 15, 1979
INVENTOR(S) : Frank C. Skrentner

It is certified that error appears in the above-identified patent and that said Letters Patent are hereby corrected as shown below:

Claim 5 (Col. 5, line 30)

after the word "claim" insert "4" and cancel "has a".

Claim 5 (Col. 5, line 31)

after the word "has" insert "a".

Signed and Sealed this

Eleventh Day of September 1979

[SEAL]

Attest:

LUTRELLE F. PARKER

Attesting Officer   Acting Commissioner of Patents and Trademarks